May 30, 1933.  C. H. GRANGER  1,911,565
SYNCHRONOUS ELECTRIC CLOCK
Filed March 30, 1931
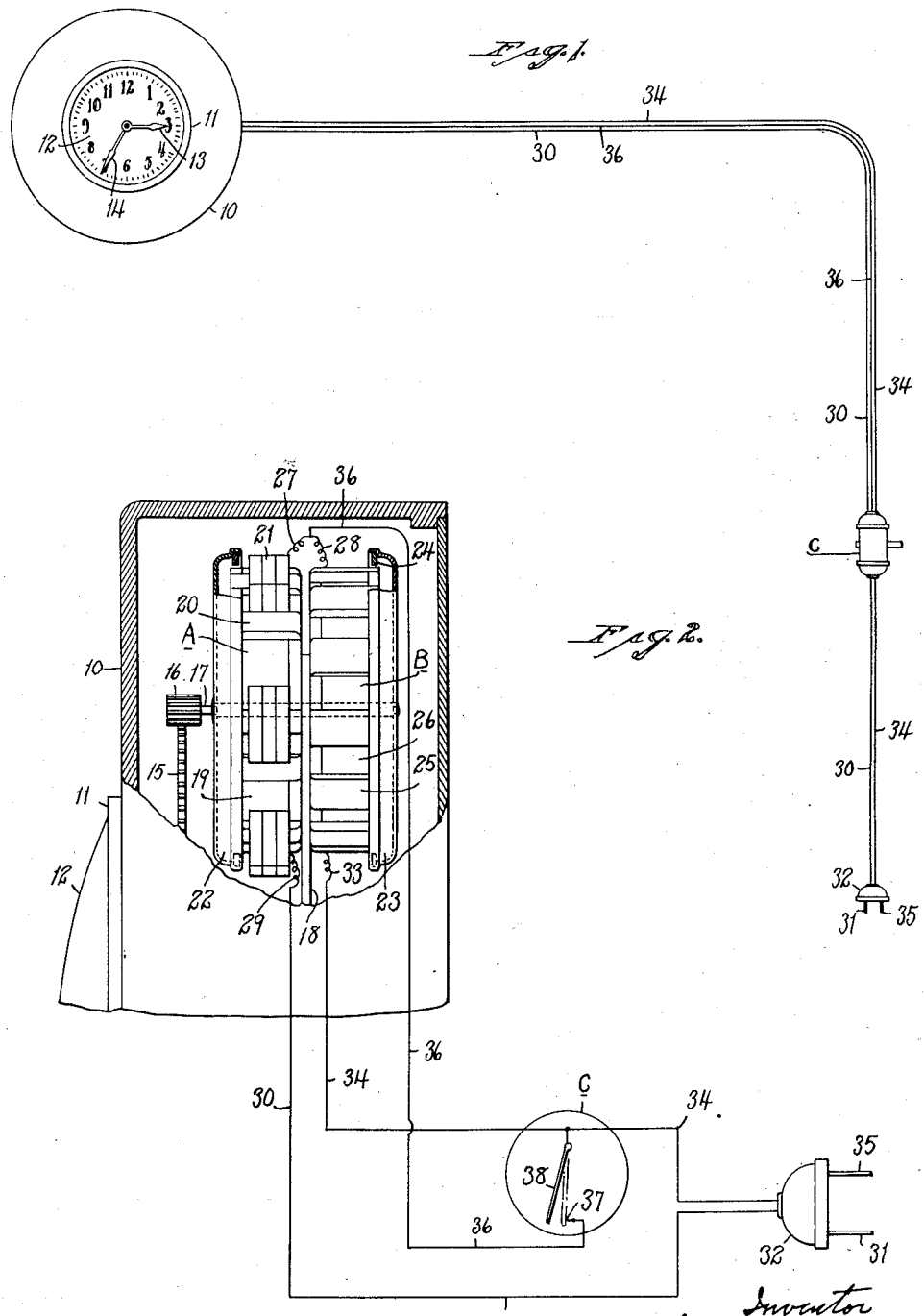

Patented May 30, 1933

1,911,565

UNITED STATES PATENT OFFICE

CHARLES H. GRANGER, OF WATERBURY, CONNECTICUT, ASSIGNOR TO WATERBURY CLOCK COMPANY, OF WATERBURY, CONNECTICUT, A CORPORATION

SYNCHRONOUS ELECTRIC CLOCK

Application filed March 30, 1931. Serial No. 526,232.

This invention relates to an improvement in electric clocks and particularly to electric clocks designed to keep in step, so to speak, with the beat of a sinuous electric current and commonly referred to, for that reason, as synchronous electric clocks.

The main object of my present invention is to provide an electric clock of the type referred to with simple, convenient and effective means whereby it may be temporarily speeded up when slow to compensate for interruptions which may have taken place in the current supplied thereto.

With the above and other objects in view as will appear from the following, my invention consists in a synchronous electric clock characterized by its provision with time-indicating means such as hour- and minute-hands; a synchronous electric governor mechanically connected to the said time-indicating means to electrically interlock the same with the beat of a sinuous electric current; an electric driving-motor of higher speed than the synchronous speed of the said synchronous electric governor to which it is connected for being restrained to a definite speed therewith, and also coupled to the said time-indicating means for driving the same; and means for cutting the said synchronous electric governor out of action to relieve the said higher speed driving-motor of the restraint thereof to temporarily speed up the said time-indicating means to compensate for interruptions in the current.

My invention further consists in a synchronous electric clock characterized as above and having certain other details of construction and combinations of parts as will be hereinafter described and particularly recited in the claim.

In the accompanying drawing:

Fig. 1 is a view in front elevation of a synchronous electric clock embodying my invention, together with the electric wiring and speed-up switch thereof; and Fig. 2 is a broken view mainly in side elevation with the casing partly broken away to expose the synchronous electric governor and the driving-motor, together with a portion of the clock-train, the electric circuit and speed-up switch being shown diagrammatically.

The synchronous electric clock herein chosen for the illustration of my invention consists generally of a casing 10 mounting a bezel 11 which in turn carries a crystal 12 overlying the hour- and minute-hands 13 and 14 respectively, all in the usual manner of electric clocks.

The hour- and minute-hands 13 and 14 are electrically propelled as will hereinafter appear, through the intermediary of a gear-train which, being of ordinary well-understood construction, is not shown herein save its main gear 15 which meshes into and is driven by a driving-pinion 16 mounted upon the forward end of a drive-shaft 17 supported in any approved manner in a vertical plate 18 forming a feature of the clock structure and enclosed within the casing 10 before referred to.

For the purpose of turning the drive-shaft 17 to effect the driving of the hands 13 and 14 through the intermediary of the pinion 16, gear 15 and associated parts, I employ an electric driving-motor generally designated by the letter A, which is preferably of the self-starting type and may be of any approved construction and, as herein shown, consists of a field-coil 19 magnetically energizing interspersed field-poles 20, certain of which are provided with shading-coils 21 to provide a rotating magnetic field for the propulsion, at a relatively-high speed, of an armature or rotor 22 secured to the forward end of the drive-shaft 17, before referred to.

For the purpose of interlocking the drive-shaft 17 and hence, the hour- and minute-hands 13 and 14, with the beat of a sinuous electric current, I employ a synchronous electric governor, generally designated by B, which corresponds to a synchronous electric motor in its structure, though as herein employed, its function is that of a governor rather than a motor, to restrain the relatively-high speed of the driving-motor A, already referred to, and compel the same to run in consonance with the beat of a timeregulated sinuous current, as will hereinafter appear.

The said governor B consists of a relatively-slow speed armature or rotor 23 having a hardened steel member 24 and mounted upon the rear end of the drive-shaft 17, already referred to. The rotation of the armature 23 is controlled by field-poles 25 energized by a coil 26 and serving to cause the said rotor to revolve at a definite speed strictly in consonance with the beat of a sinuous current passing through the said coil 26.

Any well designed synchronous motor may be employed in my improved clock as a governor so that no detailed description of the governor is required, other than that already given.

The coil 19 of the driving-motor A has one of its leads 27 coupled to the lead 28 of the coil 26 of the governor B. The opposite lead 29 of the coil 19 is connected, by means of a wire 30, to one prong 31 of a conventional plug 32. Similarly, the opposite lead 33 of the coil 26 is connected by a wire 34 to the complementary prong 35 of the plug 32, just referred to. From the foregoing, it will be seen that the coils 19 and 26 of the motor A and governor B respectively are connected in series so as to be simultaneously energized.

For the purpose of cutting the synchronous governor B out of action for the purpose as will hereinafter appear, by cutting off the flow of current through its coil 26, I couple into the lead 28 at the point of its junction with the lead 27, a wire 36 which leads to one contact 37 of a speed-up switch generally designated by the letter C. The blade 38 of the said switch is electrically connected to the wire 34 so that, when the said blade 38 is thrown into engagement with the contact 37, as indicated by broken lines (Fig. 2), a path is provided for the flow of current through the coil 19 of the driving motor A without requiring the said current to flow through the coil 26 of the governor, so that the latter is effectually cut out of action.

Let it be supposed for purposes of description, that the normal speed of the rotor 22 of the driving-motor A is 600 R. P. M., which normal speed will always be in excess of the speed of the synchronously-rotating armature 23.

Let it further be supposed that the synchronous speed of the armature 23 of the synchronous governor A is 300 R. P. M. in response to a 60-cycle alternating current, and that the gearing between the same and the hands 13 and 14 is such as to cause the latter to indicate correct time at the governor speed given.

When the plug 32 is connected into an outlet supplying alternating-current of a carefully-timed frequency, both of the coils 19 and 26 will be energized with the result that the armature 22 will turn the drive-shaft 17 and through the intermediary of the main gear 15 of the gear-train which it represents, will effect the movement of the hour- and minute-hands 13 and 14. Instead, however, of driving the hands as described at the excessive speed which would result from the revolving of the pinion 16 at approximately 600 R. P. M. (the unrestrained speed of the driving-motor), the synchronous governor B serves at this time to restrain the driving-motor and limit its speed to 300 R. P. M., or such other speed as will cause the hour- and minute-hands 13 and 14 to indicate the correct time in consonance with the beat of a synchronous current supplied to the coil 26 of the said governor.

If for any reason, such as the periodic failure of the current-supply, the clock should run slow, it may be speeded up to correct time by operating the switch C so as to move its blade into the position shown by broken lines in Fig. 2 and thus cut the synchronous electric governor B out of action by providing a path for the current-flow through the coil 19 of the driving-motor A, independent of the governor, as already described.

The cutting out of action of the synchronous electric governor relieves the driving-motor of the restraint thereof and permits its rotor 22 to revolve at a higher speed than normal, with the result that the hour- and minute-hands 13 and 14 are moved more rapidly than their normal time-indicating speed. When the said hour- and minute-hands have been speeded up as described until they indicate correct time, the switch C is again operated, with the effect of energizing the coil 26 of the synchronous governor and restoring the same to action. The synchronous governor B will now immediately act to again restrain the driving-motor A to a speed strictly in accordance with the beat of the sinuous electric current supplied to it.

By employing a relatively high-speed driving-motor and a relatively lower-speed synchronous electric governor for normally restraining the former to a definite speed, I am enabled to provide for speeding up the clock in the event it has been slowed up by current interruptions or other untoward circumstances, by temporarily cutting out the synchronous electric governor as described, without requiring the hands to be re-set manually, with the attendant difficulty and annoyance and the possibility of derangement.

It will be understood by those skilled in the art that my invention may assume varied physical forms without departing from my inventive concept, and I, therefore, do not limit myself to the specific embodiment herein chosen for illustration, but only as indicated in the appended claim.

I claim:

In a synchronous electric clock, the combination with the time-indicating means thereof, of a synchronous electric governor connected to the said time-indicating means for electrically interlocking the same with the beat of a sinuous electric current; a driving-motor of higher speed than the synchronous speed of the said synchronous electric governor to which it is connected for being restrained to a definite speed thereby and also connected to the said time-indicating means for driving the same; an electric circuit arranged to normally place the said driving-motor and the said synchronous governor in series with each other; and a switch interposed in the circuit to shunt the current through the said driving-motor to the exclusion of the said synchronous electric governor to relieve the former of the restraint of the latter for temporarily speeding up the said time-indicating means to compensate for interruptions in current.

In testimony whereof, I have signed this specification.

CHARLES H. GRANGER.